(12) United States Patent
Myllymaki et al.

(10) Patent No.: US 7,467,391 B2
(45) Date of Patent: Dec. 16, 2008

(54) ALLOWING CLIENT APPLICATIONS TO PROGRAMMATICALLY ACCESS WEB SITES

(75) Inventors: Jussi Petri Myllymaki, San Jose, CA (US); Kevin Scott Beyer, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 683 days.

(21) Appl. No.: 10/284,918

(22) Filed: Oct. 30, 2002

(65) Prior Publication Data

US 2004/0088713 A1    May 6, 2004

(51) Int. Cl.
G06F 3/00      (2006.01)
G06F 9/44      (2006.01)
G06F 9/46      (2006.01)
G06F 13/00     (2006.01)

(52) U.S. Cl. .................. 719/320; 707/10; 709/230
(58) Field of Classification Search ......... 719/310–320, 719/328–330; 707/10; 709/201, 217–219, 709/230–231, 245
See application file for complete search history.

(56) References Cited

U.S. PATENT DOCUMENTS

| | | | |
|---|---|---|---|
| 6,195,677 B1 | 2/2001 | Utsumi ..................... 709/201 |
| 6,289,382 B1 | 9/2001 | Bowman-Amuah ......... 709/226 |
| 2002/0099738 A1* | 7/2002 | Grant ......................... 707/513 |
| 2003/0135584 A1* | 7/2003 | Roberts et al. .............. 709/218 |
| 2003/0167355 A1* | 9/2003 | Smith et al. ................. 709/328 |
| 2004/0003033 A1* | 1/2004 | Kamen et al. ............... 709/203 |
| 2004/0030740 A1* | 2/2004 | Stelting ...................... 709/201 |
| 2006/0294253 A1* | 12/2006 | Linderman .................. 709/230 |

OTHER PUBLICATIONS

Ramakrishnan, Web Servies: OR's Newest Ally, OR/MS Today—Business Application, Dec. 2001, pp. 1-6.*
IBM, Web Services Toolkit, 2000, pp. 1-9.*
Basudevan, A Web Services Primer, XML.com, Apr. 4, 2001, pp. 1-10.*
Snell et al, Programming Web Services with SOAP, O'Reilly, Dec. 2001.*

(Continued)

Primary Examiner—Meng-Ai An
Assistant Examiner—Diem K Cao
(74) Attorney, Agent, or Firm—Cantor Colburn LLP; Leonard T. Guzman

(57) ABSTRACT

A method for creating a web service to programmatically access a network addressable location via an intermediate gateway includes analyzing a network at the location; generating, at the gateway, a service description file and an executable code for the network page; translating the service description file into a standard Web service format; deploying the service to the gateway, making the service available to a client application; providing a runtime process to enable the client application to automatically make a programmatic request of the location; translating the structure of the request to a syntax of location using SOAP; submitting the request to the location which executes the submitted request to obtain a response; translating the response to extract data satisfying the request; wrapping the extracted data in a SOAP envelope; translating the wrapped response to a host data structure of the client application; and compiling the executable code.

18 Claims, 10 Drawing Sheets

OTHER PUBLICATIONS

Roy et al, Understanding Web Services, IEEE, 2001, pp. 69-73.*
Kao, Developer's Guide to Building XML-based Web Services, The Middleware Company, Jun. 2001, pp. 1-21.*
Lambros et al, Combine business management technology and business services to implement complex Web services, IBM, May 2001, pp. 1-27.*
Duftler et al, Web Services Invocation Framework, IBM Research Center, Aug 9, 2001, pp. 1-8.*
Brittenham, Web SErvices Development Concepts, IBM Software Group, May 2001, pp. 1-32.*
Windows Developer's Journal, vol. 12, No. 10, Oct. 2001.

* cited by examiner

ALLOWING CLIENT APPLICATIONS TO PROGRAMMATICALLY ACCESS WEB SITES

FIELD OF THE INVENTION

The present invention relates to the field of data processing, and particularly to a software system and associated method that provides an analysis process and interface for accessing data coded in a display markup language, such as HTML, and maintained in systems that are linked together over an associated network, such as the Internet. More specifically, this invention pertains to a computer software product that enables a client application to programmatically access a Web site.

BACKGROUND OF THE INVENTION

The World Wide Web (WWW) is comprised of an expansive network of interconnected computers upon which businesses, governments, groups, and individuals throughout the world maintain inter-linked computer files known as Web pages. Users navigate these pages by means of computer software programs commonly known as Internet browsers.

The authors of Web pages provide information known as metadata, within the body of the markup language document that defines the Web pages; commonly the markup language used is HTML, hypertext markup language. A computer software product known as a Web crawler systematically accesses Web pages by sequentially following hypertext links from page to page. The crawler indexes the pages for use by the search engines using information about a Web page as provided by its address or universal resource locator (URL), metadata, and other criteria found within the page.

Much of the publicly available information on the Internet is intended to be viewed by humans using browsers. These Web sites are primarily designed using the HTTP transport protocol and HTML display markup language. The use of HTML for presentation of Web data makes it difficult for application developers to gain programmatic access to the data on those Web sites.

The World Wide Web is increasingly used as a critical information source for both businesses and consumers. Recent advances in business-to-business (B2B) technologies have resulted in the definition of standard interfaces for data exchange between companies. Web services are standard mechanisms for applications to inter-operate using Web protocols, i.e., programs that access remote computers to access data or to render other services such as weather, etc. These Web services use a remote procedure call (RPC). The RPC mechanism is an established concept, but uses Web protocols and data formats such as HTTP, XML, SOAP, or UDDI. The design of application programming interfaces (API) to access Web data is relatively difficult because Web sites make data available in a presentation markup language such as HTML but not in a computer-friendly format like XML, SOAP, or UDDI.

As an example, a Web site provides data that a business is interested in, such as weather or stock quotes. Human users can view this site using their browser, but the business wishes to programmatically automate the retrieval of information from that site. There is currently no means to automatically create an API to access the data on the Web site of interest.

Access to the Web site includes the request for information by the user and the response of the Web site to that request. Currently, for every Web site or request to a specific Web site, the programmer must spend significant time and effort analyzing methods for sending the request and retrieving the desired information. This task takes a great deal of programming skill, wherein the business wishing to programmatically access the information on the desired Web site may not have an employee with sufficient skill.

Though the lack of application programming interfaces (API) for Web data is partially helped by recent advances in Web data extraction technologies, the problem remains that no solutions exist for creating a standard interface description for the Web at large. What is therefore needed is a system for Web site analysis and program development that aids programmers in the development of programs or applications to automatically request and retrieve data from Web sites on the Internet that use a variety of data forms and protocols. The need for such a system has heretofore remained unsatisfied.

SUMMARY OF THE INVENTION

In an exemplary embodiment, a processor-implemented method for creating a web service to programmatically access a network addressable location via an intermediate gateway. includes analyzing a network page at the network addressable location: generating, at the intermediate gateway, a service description file and an executable code for the network page; translating the service description file into an executable code; translating the service description file into a standard Web service format including at least one of WSDL, WDS, or ISD; deploying the web service to the intermediate gateway, wherein the web service includes the executable code and the service description file, making the web service available to a client application; providing a runtime process to enable the client application to automatically make a programmatic request of the network addressable location; wherein the programmatic reciuest includes a host language having a structure; translating the structure of the programmatic request to a syntax of the network addressable location using a simple object access protocol (SOAP); submitting the programmatic request that uses the translated structure to the network addressable location using SOAP; the network addressable location executing the submitted programmatic request to obtain a response; translating the response to extract data satisfying the programmatic request; wrapping the extracted data in a SOAP envelope; and translating the wrapped response to a host data structure of the client application; and compiling the executable code.

In another embodiment, computer program product having executable instruction codes that are stored on a computer usable medium, for creating a web service to programmatically access a network addressable location via an intermediate gateway includes a set of instruction codes for analyzing a network page at the network addressable location; a set of instruction codes for generating, at the intermediate gateway, a service description file and an executable code for the network page; a set of instruction codes for translating the service description file into an executable code; a set of instruction codes for translating the service description file into a standard Web service format including at least one of WSDL, WDS, or ISD; a set of instruction codes for deploying the web service to the intermediate gateway, wherein the web service includes the executable code and the service description file, making the web service available to a client application; a set of instruction codes for providing a runtime process to enable the client application to automatically make a programmatic request of the network addressable location; wherein the programmatic request includes a host language having a structure; a set of instruction codes for translating the structure of the Programmatic request to a syntax of the network addressable location using a simple object access protocol (SOAP);

a set of instruction codes for submitting the programmatic request that uses the translated structure to the network addressable location using SOAP; the network addressable location executing the submitted programmatic request to obtain a response; a set of instruction codes for translating the response to extract data satisfying the programmatic request; a set of instruction codes for wrapping the extracted data in a SOAP envelope: a set of instruction codes for translating the wrapped response to a host data structure of the client application; and a set of instruction codes for compiling the executable code.

In still another embodiment, a processor-implemented system for creating a service interface to programmatically access a network addressable location via an intermediate gateway includes means for analyzing a network page at the network addressable location; means for generating, at the intermediate gateway, a service description file and an executable code for the network page; means for translating the service description file into an executable code; means for translating the service description file into a standard Web service format including at least one of WSDL, WDS, or ISD; means for deploying the web service to the intermediate gateway, wherein the web service includes the executable code and the service description file, making the web service available to a client application; means for providing a runtime process to enable the client application to automatically make a programmatic request of the network addressable location; wherein the programmatic request includes a host language having a structure; means for translating the structure of the programmatic request to a syntax of the network addressable location using a simple object access protocol (SOAP); means for submitting the Programmatic request that uses the translated structure to the network addressable location using SOAP; the network addressable location executing the submitted programmatic request to obtain a response; means for translating the response to extract data satisfying the programmatic request; means for wranpina the extracted data in a SOAP envelope; means for translating the wranned response to a host data structure of the client application; and means for compiling the executable code.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
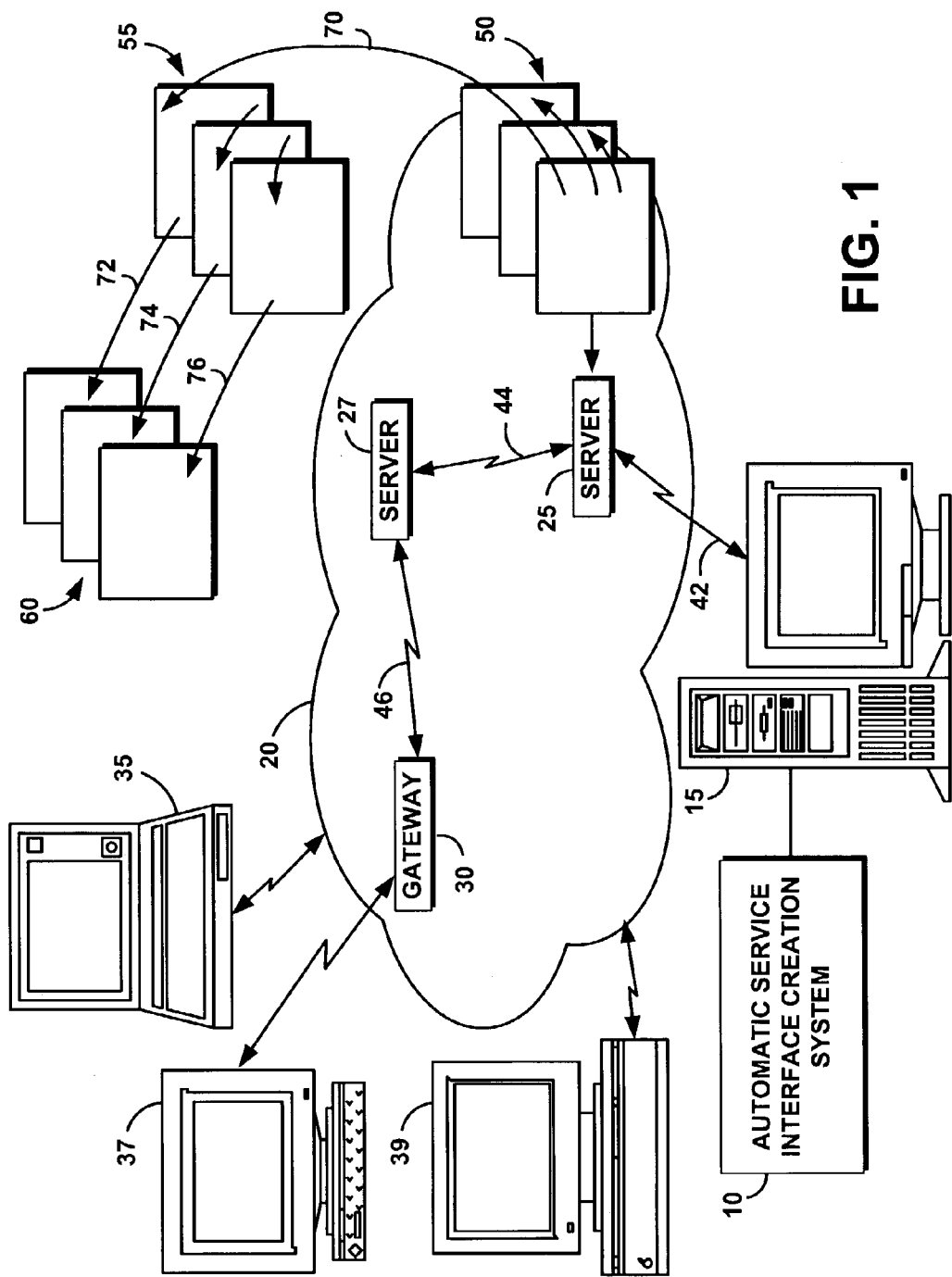
FIG. 1 is a schematic illustration of an exemplary operating environment in which an automatic service interface creation system of the present invention can be used.

The following definitions and explanations provide background information pertaining to the technical field of the present invention, and are intended to facilitate the understanding of the present invention without limiting its scope:

API: (Application Program Interface) A language and message format used by an application program to communicate with the operating system or some other system or control program such as a database management system (DBMS) or communications protocol.

Crawler: A program that automatically explores the World Wide Web by retrieving a document and recursively retrieving some or all the documents that are linked to it.

GUI (Graphical User Interface): A graphics-based user interface that incorporates icons, pull-down menus and a mouse.

HTML (Hypertext Markup Language): A standard language for attaching presentation and linking attributes to informational content within documents. During a document authoring stage, HTML "tags" are embedded within the informational content of the document. When the Web document (or "HTML document") is subsequently transmitted by a Web server to a Web browser, the tags are interpreted by the browser and used to parse and display the document. In addition to specifying how the Web browser is to display the document, HTML tags can be used to create hyperlinks to other Web documents.

HTTP (HyperText Transport Protocol): The communications protocol used to connect to servers on the World Wide Web. Its primary function is to establish a connection with a Web server and transmit HTML pages to the client browser.

Internet: A collection of interconnected public and private computer networks that are linked together with routers by a set of standards protocols to form a global, distributed network.

SOAP (Simple Object Access Protocol): A message-based protocol based on XML for accessing services on the Web employing XML syntax to send text comma URL (Uniform Resource Locator): A unique address that fully specifies the location of a content object on the Internet. The general format of a URL is protocol://server-address/path/filename.

Web browser: A software program that allows users to request and read hypertext documents. The browser gives some means of viewing the contents of Web documents and of navigating from one document to another.

Web document or page: A collection of data available on the World Wide Web and identified by a URL. In the simplest, most common case, a Web page is a file written in HTML and stored on a Web server. It is possible for the server to generate pages dynamically in response to a request from the user. A Web page can be in any format that the browser or a helper application can display. The format is transmitted as part of the headers of the response as a MIME type, e.g. "text/html", "image/gif". An HTML Web page will typically refer to other Web pages and Internet resources by including hypertext links.

Web site: A database or other collection of inter-linked hypertext documents ("Web documents" or "Web pages") and associated data entities, which is accessible via a computer network, and which forms part of a larger, distributed informational system such as the WWW. In general, a Web site corresponds to a particular Internet domain name, and includes the content of a particular organization. Other types of Web sites may include, for example, a hypertext database of a corporate "intranet" (i.e., an internal network which uses standard Internet protocols), or a site of a hypertext system that uses document retrieval protocols other than those of the WWW.

World Wide Web (WWW, also Web): An Internet client—server hypertext distributed information retrieval system.

XML: eXtensible Markup Language. A standard format used to describe semi-structured documents and data. During a document authoring stage, XML "tags" are embedded within the informational content of the document. When the XML document is subsequently transmitted between computer systems, the tags are used to parse and interpret the document by the receiving system.

FIG. 1 portrays an exemplary overall environment in which an automatic service interface creation system 10 and associated method for discovering and creating service descriptions according to the present invention may be used. System 10 includes a software programming code or computer program product that is typically embedded within, or installed on a host server 15. Alternatively, system 10 can be saved on a suitable storage medium such as a diskette, a CD, a hard drive, or like devices. While the system 10 will be described in connection with the WWW, the system 10 can be used with a stand-alone database of terms that may have been derived from the WWW and/or other sources.

The cloud-like communication network 20 is comprised of communication lines and switches connecting computers such as servers 25, 27, to gateways such as gateway 30. The servers 25, 27 and the gateway 30 provide the communication access to the WWW or Internet. Users, such as remote Internet users, are represented by a variety of computers such as computers 35, 37, 39, and clients applications that can be incorporated on the network servers, such as server 27, can query the host server 15 for desired information through the communication network 20. Computers 35, 37, 39 each include software that will allow the user to browse the Internet and interface securely with the host server 15.

The host server 15 is connected to the network 20 via a communications link 42 such as a telephone, cable, or satellite link. The servers 25, 27 can be connected via high-speed Internet network lines 44, 46 to other computers and gateways. The servers 25, 27 provide access to stored information such as hypertext or Web documents indicated generally at 50, 55, and 60. The hypertext documents 50, 55, 60 most likely include embedded hypertext link to other locally stored pages, and hypertext links 70, 72, 74, 76 to other webs sites or documents 55, 60 that are stored by various Web servers such as the server 27

The operation or use of system 10 comprises the following four phases that will be described later in more detail: the analysis phase, the publishing phase, the discovery and development phase, and the runtime phase.

The Web site analysis phase analyzes the Web page of interest and generates a service description (SD) file for each form. The SD file contains all the information necessary for producing the ultimate output of the system: API description in the form of Web services description language (WSDL) files, well-defined service (WDS) files, and interface service deployment (ISD) files.

Figure 2:
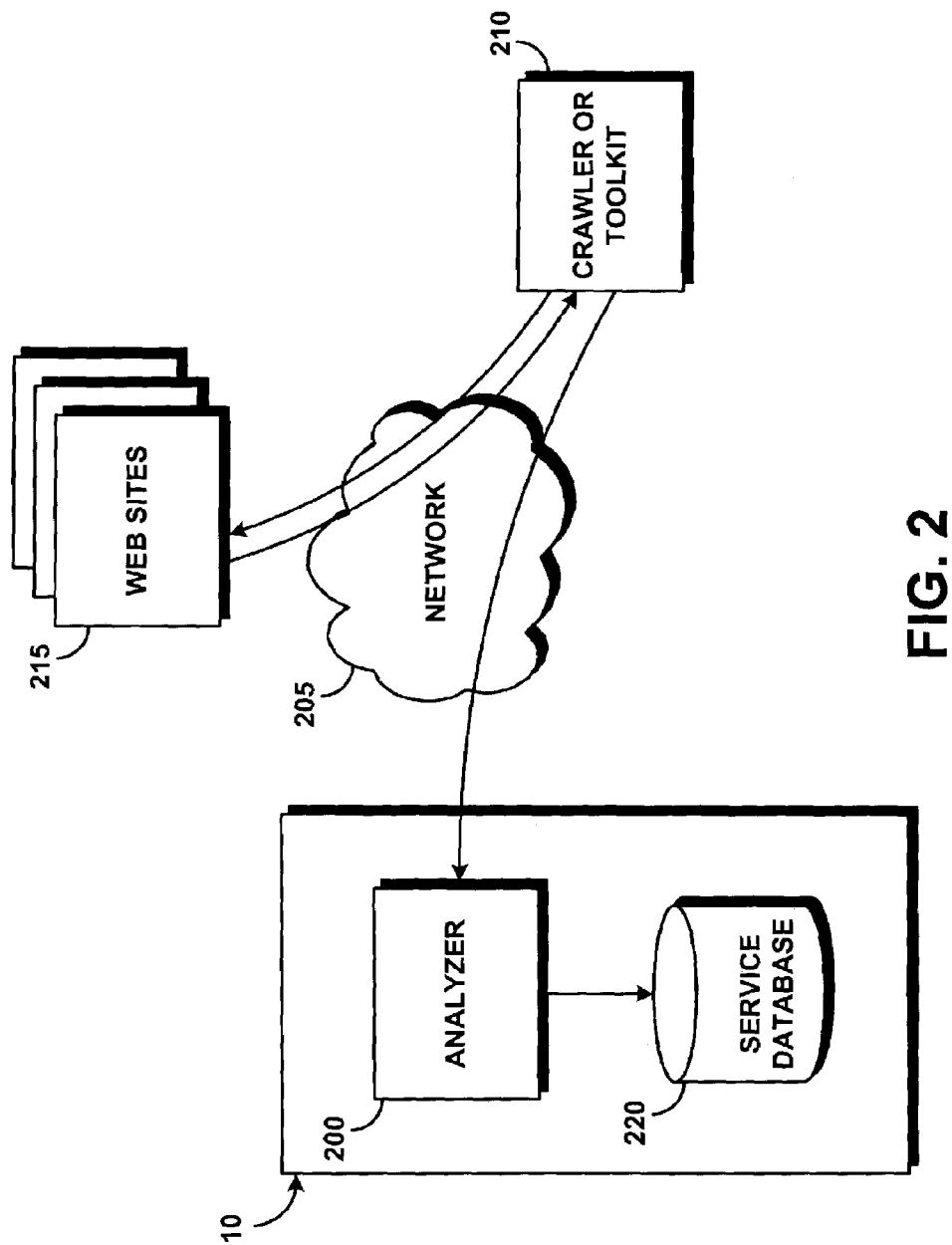
FIG. 2 illustrates a high-level of the analysis phase of the system of FIG. 1.
Figure 3:
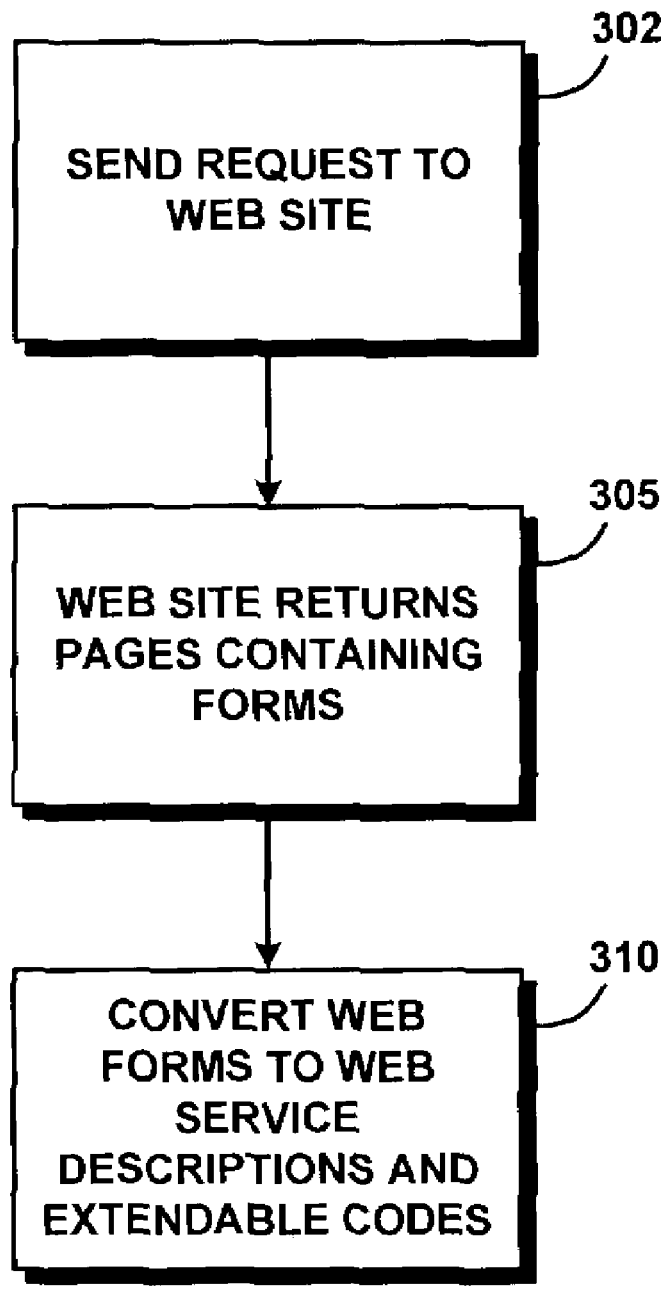
FIG. 3 is a flow chart illustrating the performance of the analysis phase of the system of FIG. 1.

The analysis phase is illustrated in FIG. 2 and by method 300 of FIG. 3. The analyzer 200 of system 10 is connected through a network 205, such as the Internet, to a crawler or toolkit 210. The crawler 210 is one source of Web pages 215 for the system 10, and it can be any one of the many currently available crawlers. Data extracted from the Web pages 215 by the analyzer 200 are stored in the service database 220.

Web pages 215 can also be accessed by a user toolkit 210. The user toolkit 210 incorporates a graphical user interface (GUI) through which the user instructs system 10 which pages or forms to analyze. One method for implementing the GUI is to embed the toolkit 210 in a Web browser.

While the user is browsing the Web sites, a panel next to the main viewing area provides buttons or links that allow the user to mark the current page or form for further analysis. Pages or forms selected by the user are then transferred to the analyzer 200. The user toolkit 210 also includes a data extraction feature that instructs a data extractor component how to extract data from pages returned to system 10 when the forms are submitted for analysis.

With further reference to FIG. 3, the crawler 210 sends a request in step 302 to the Web site 215, fetching via the Internet or other network 205 one or more "seed pages" which are Web sites 215. These seed pages 215 contain hyperlinks, or URLs. The URLs are extracted and inserted into a URL pool.

The crawler 210 then iteratively fetches a URL from the pool and fetches the corresponding document from the Web site 215 in step 305. For example, if the Web page 215 is an HTML page, URLs of the Web site 215 are again extracted and inserted in the URL pool.

The crawler 210 is configured to crawl only to a certain "depth"; i.e., it may only move a certain number of links away from the Web pages 215. The distance is measured in terms of the number of links followed, so if the depth is three, the crawler will not go farther than three links away from the Web pages 215. Other parameters may control the speed and frequency with which Web documents are accessed, and whether every link is followed or a filtering mechanism allows for only a subset of all possible links to be pursued.

Figure 4:
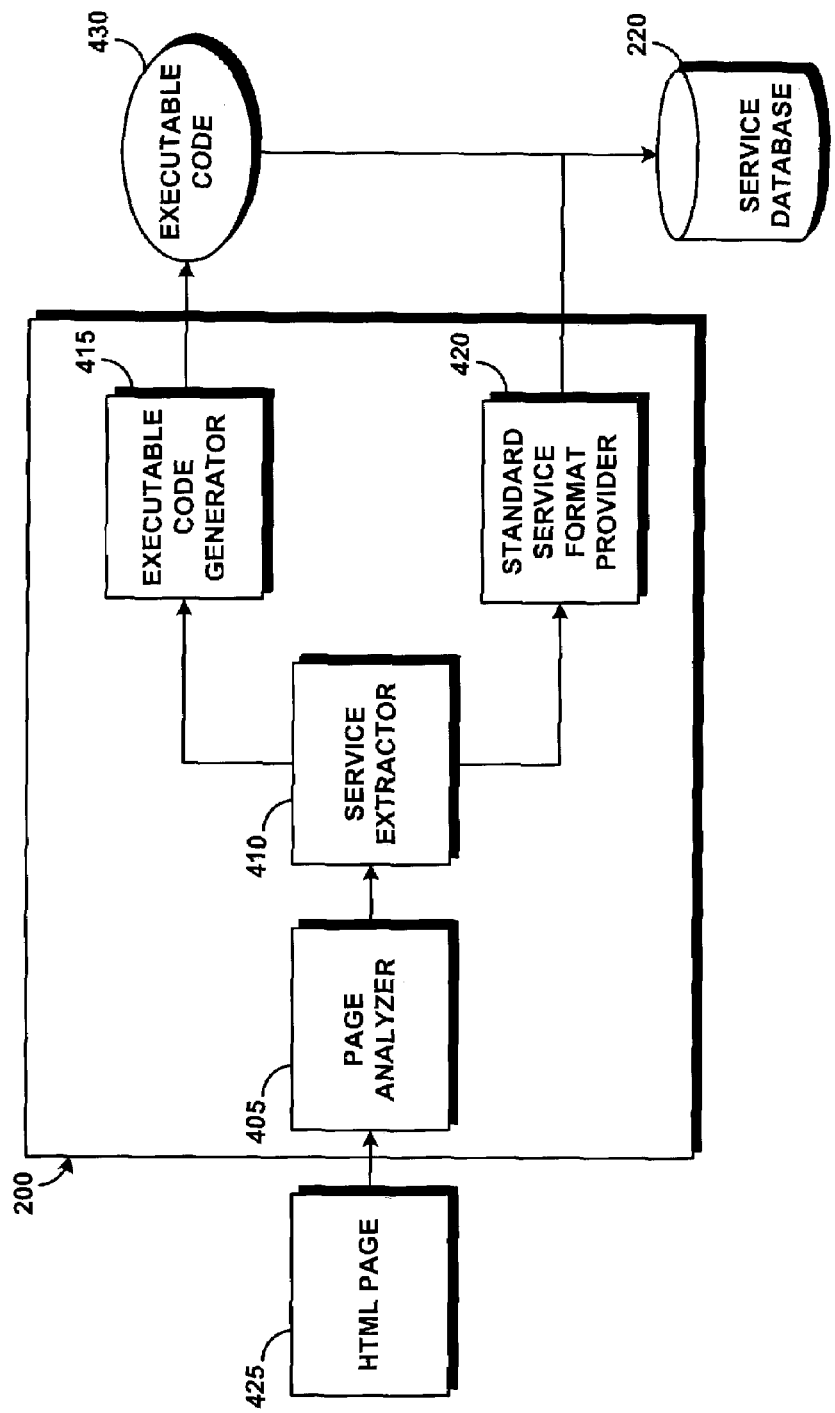
FIG. 4 is a block diagram that illustrates a high-level architecture of an analyzer shown in FIG. 2.

The crawler 210 passes each page 215 retrieved from the Web to the page analyzer 200 in step 310. The functions of the page analyzer 200 are shown in more detail in FIG. 4.

The analyzer 200 is generally comprised of a page analyzer 405, a service extractor 410, an executable code generator 415, and a standard service format producer 420. The page analyzer 405 scans the code of a Web page such as HTML page 425 and finds sections of that page that constitute a Web form. One page may contain several forms. For example, a form is identified in HTML by a "<FORM>" tag and contains one or more data entry tags such as "<INPUT>" and "<SELECT>". The service extractor 410 then translates these forms into service descriptions.

The service extractor 410 analyzes a set of forms that originally resided on a single Web page and prepares the data for subsequent output as a service description by the standard service format producer 420. The service extractor 410 performs the following tasks:

Assigns a name to the service based on the title of the Web page, the URL, or an encoded value of either one.

Extracts the description (metadata) of the service from the <META> tags of the Web page.

Assigns a synthetic name to each form residing on the Web page based on position number of the form. For example, form number 1 would be assigned the name "method 1".

Extracts the HTTP access method used in each form (GET or POST).

Translates the name of each form variable (variables listed in <INPUT> and <SELECT> tags) into a variable name compatible with the executable code language.

Defines the data type of each form variable using the XML schema language.

The service extractor packages the information it extracted into a service description (SD) file, and passes it on to the standard service format producer 420 and to the executable code generator 415. The service description (SD) file is a composite file that contains all the information needed to invoke the Web service. The service extractor 410 converts forms such as HTML page 425 into Web services that can operate on a gateway (or on the client or server computer). The SD file comprises instructions for construction of the gateway. The SD file is typically written in XML.

The executable code generator translates the SD file into an executable code 430 such as Java that implements a SOAP interface wrapper. The executable code 430 is stored in the service database 220. The standard service format producer 420 translates the SD file into standard Web service format such as WSDL (Web services description language), WDS (well defined service) and ISD (invocation service description). The WSDL, WDS, and ISD files are all stored in the service database 220.

Figure 5:
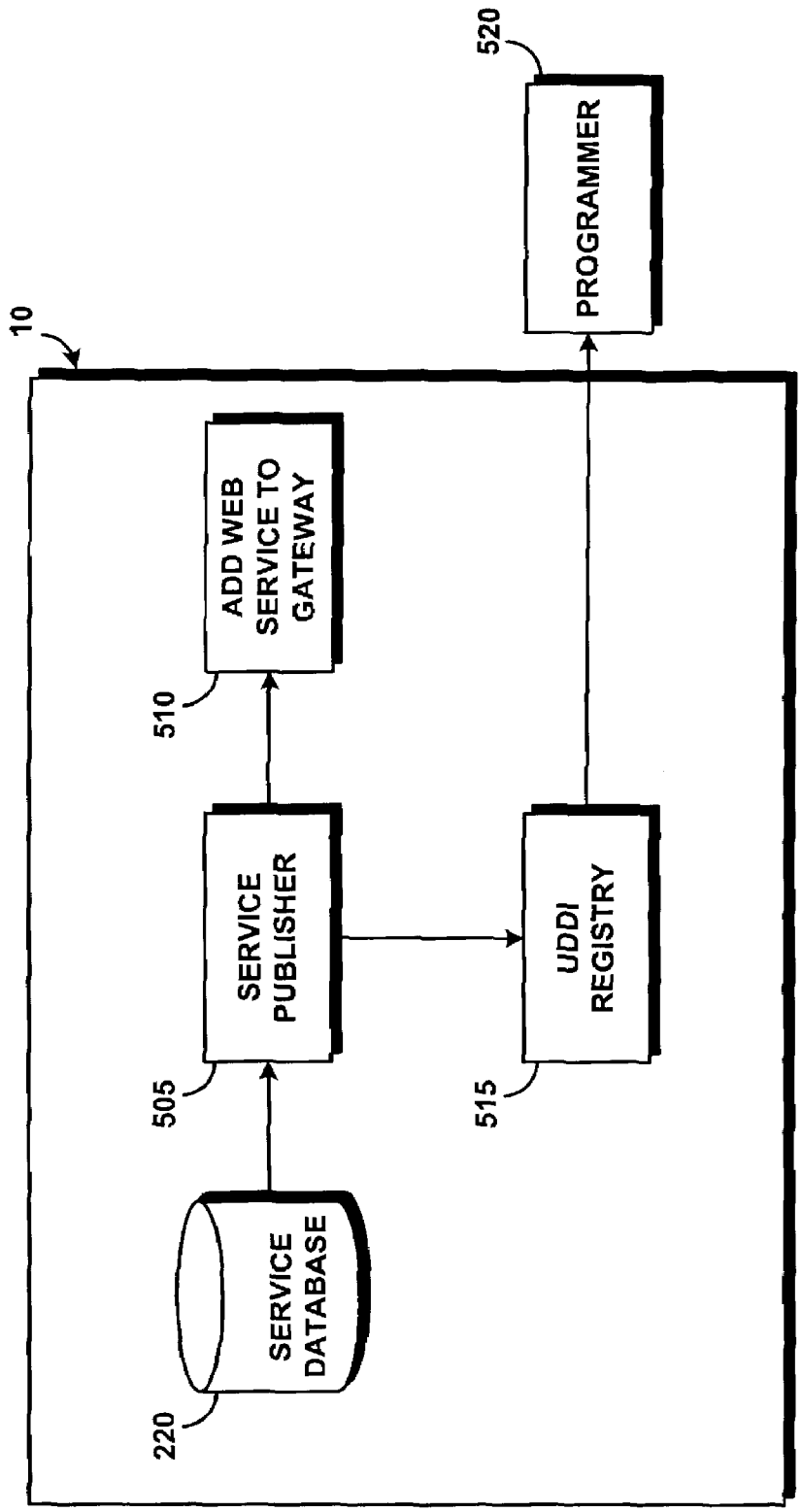
FIG. 5 illustrates a high-level architecture of the publishing phase and discovery and development phase of the system of FIG. 1.

The second phase of system 10 is the publishing phase, as illustrated by the high-level architecture of FIG. 5. The service publisher 505 gathers WSDL, WDS, ISD, and executable code files from the service database 220 and prepares them for deployment.

The service publisher 505 first invokes an executable code compiler on each executable code file and gets executable code class files as a result. The service publisher 505 then deploys each service to a gateway at block 510 by uploading the executable code to the gateway, using the executable code class file and ISD file.

This process (block 510) makes the Web service available to the client. One method for adding Web service files to the gateway at block 510 is by invoking the appropriate method in a SOAP service manager. The SOAP service manager "hosts" SOAP services on a gateway. It receives requests from a client application and invokes the appropriate executable code class file that implements the service. Any existing SOAP service manager can be used.

Next, the service publisher 505 registers each service at a UDDI (universal description, discovery, and integration) registry 515 by invoking the appropriate method in the UDDI registry 515 and providing the WSDL and WDS files as input. The UDDI registry 515 is a registration service for Web servers to advertise Web services; for system 10, the UDDI will list all services available in the SOAP service manager. A client application or programmer 520 can query the registry to find the SOAP addresses and other parameters of interesting services. Any existing UDDI registry can be used.

The third phase of the operation of system 10 is the discovery and development phase. In phase 3, the programmer 520 accesses the UDDI registry 515 and develops client programs and applications that invoke the Web server at the gateway in block 510.

In an alternative embodiment of system 10, the latter can include the Web service gateway code in the client's software, thus obviating the need for the UDDI registry 515 and the gateway at block 510.

Figure 6:
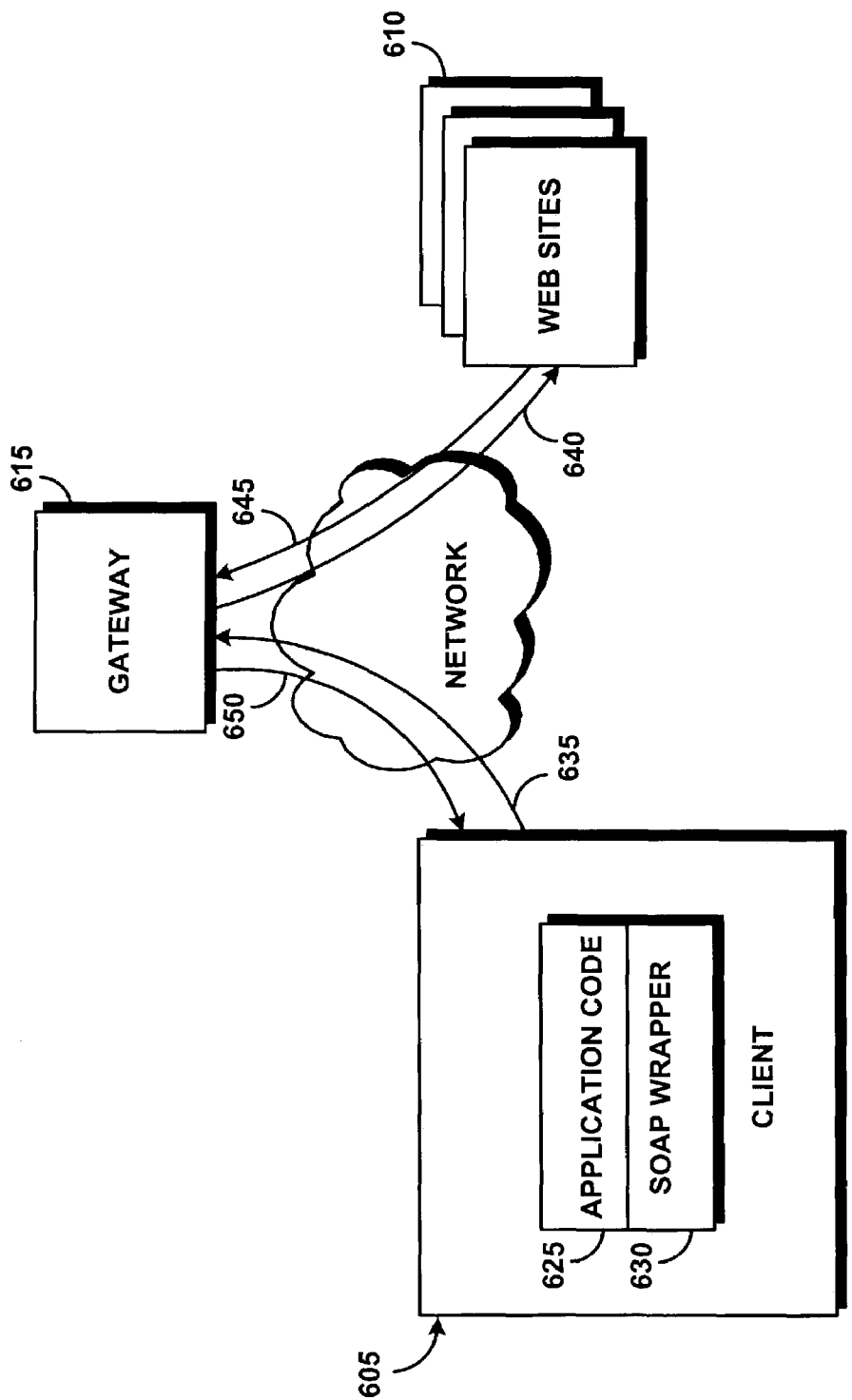
FIG. 6 illustrates a high-level architecture for a preferred embodiment of the run-time phase of the system of FIG. 1.

The fourth phase of the operation of system 10 is the runtime phase, illustrated by the high-level architecture of FIG. 6. The client 605 accesses the Web sites 610 through the gateway 615 via the network 620. The client is comprised of an application code 625 developed by a programmer and a SOAP wrapper 630 created automatically from the WSDL file by standard software development tools. The client sends a request to the gateway, as shown by network link 635.

The gateway 615 then sends a request to Web site 610 via network link 640. The Web site 610 returns to the gateway 615 a response to the request, as shown by network link 645. The gateway 615 then transfers the response of Web site 610 to the client 615 via link 650.

Web sites such as Web site 610 are designed for viewing by humans. The gateway 615 makes Web sites such as Web site 610 appear as a Web service designed for program access. The client 605 never sees the original Web site 610 form that is most likely written in HTML using the HTTP protocol. The gateway 615 translates the human readable Web site interface and presents to the client a machine readable interface most likely written in XML using the SOAP protocol.

Figure 7A:
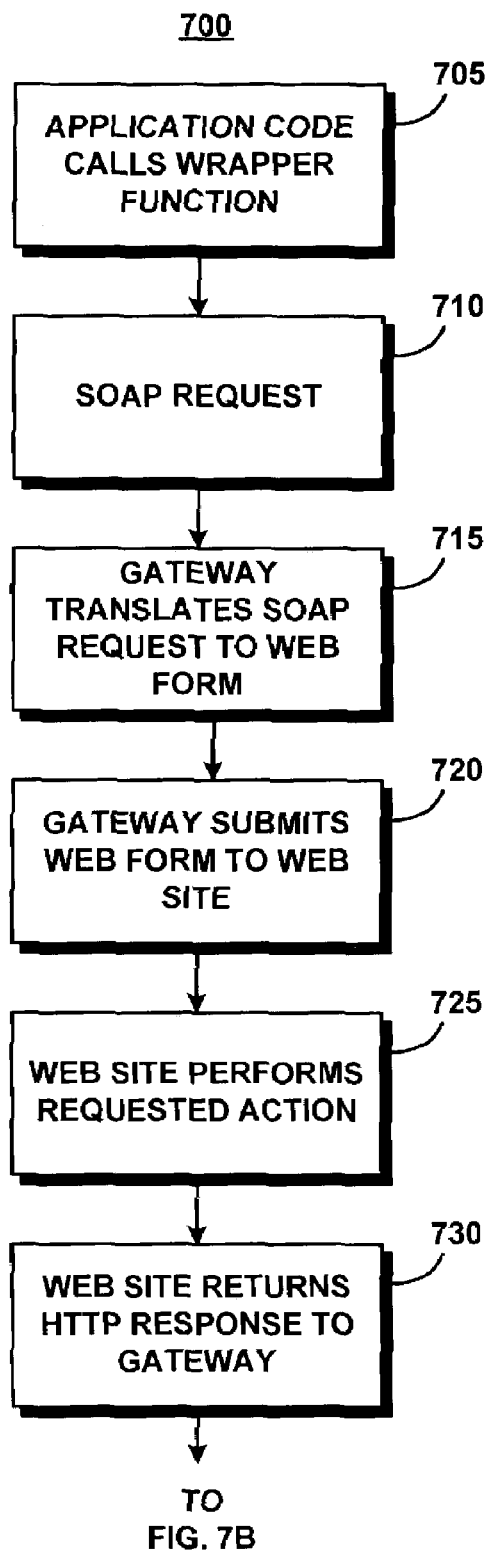
FIG. 7 is comprised of FIGS. 7A and 7B, and represents a flow chart that illustrates the performance of the system of FIG. 1 during a preferred embodiment of the run-time phase.
Figure 7B:
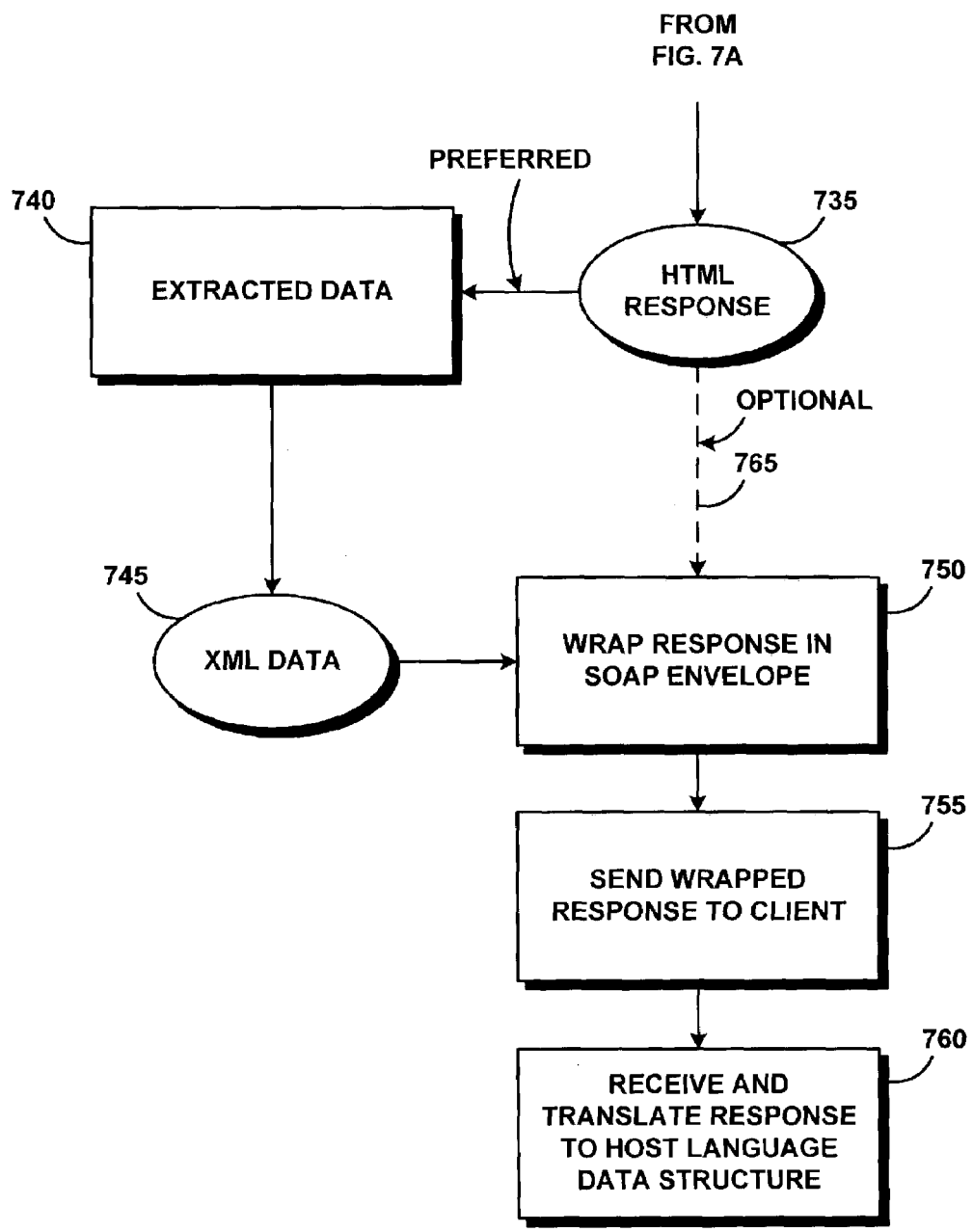

The runtime phase operation or method 700 is illustrated by the flowchart of FIGS. 7A and 7B. The client 605 wishes to make a programmatic request of the Web site 610. This process is initiated when the application code 625 calls the wrapper function in step 705. The SOAP wrapper 630 translates the host language structure, such as Java, to SOAP. The request of the client 605 is transferred in step 710 to the gateway via network link 635, using SOAP protocol. In step 715, the gateway 615 translates the SOAP request to the format required by the Web site 610; i.e., HTTP post.

The gateway 615 submits the Web form to the Web site 610 in step 720 via network link 640 using, for example, HTTP protocol. In step 725, the Web site 610 performs the action requested by the user in step 705, i.e., execute a database query.

The Web site 610 returns the response to the gateway 615 via the network link 645 in step 730; the data format for the response shown by network link 645 is typically HTML, using HTTP protocol. In the preferred method of system 10, the HTTP response (step 735) is translated by the gateway 615 to extract data in step 740.

The result of the data extraction is shown in step 745 as XML data. The XML data 745 is wrapped in a SOAP envelope by the gateway 615 in step 750. The wrapped response is transmitted via network link 650 to the client 605 in step 755. The protocol for network link 650 is SOAP with data format of XML.

Then, in step 760 the wrapped response to the original Web site 550 request is received and translated to the host data structure (e.g. Java) by the SOAP wrapper 630. Alternatively, the HTTP response may not be translated to XML, but instead wrapped directly in a SOAP envelope as shown by optional path 765.

Figure 8:
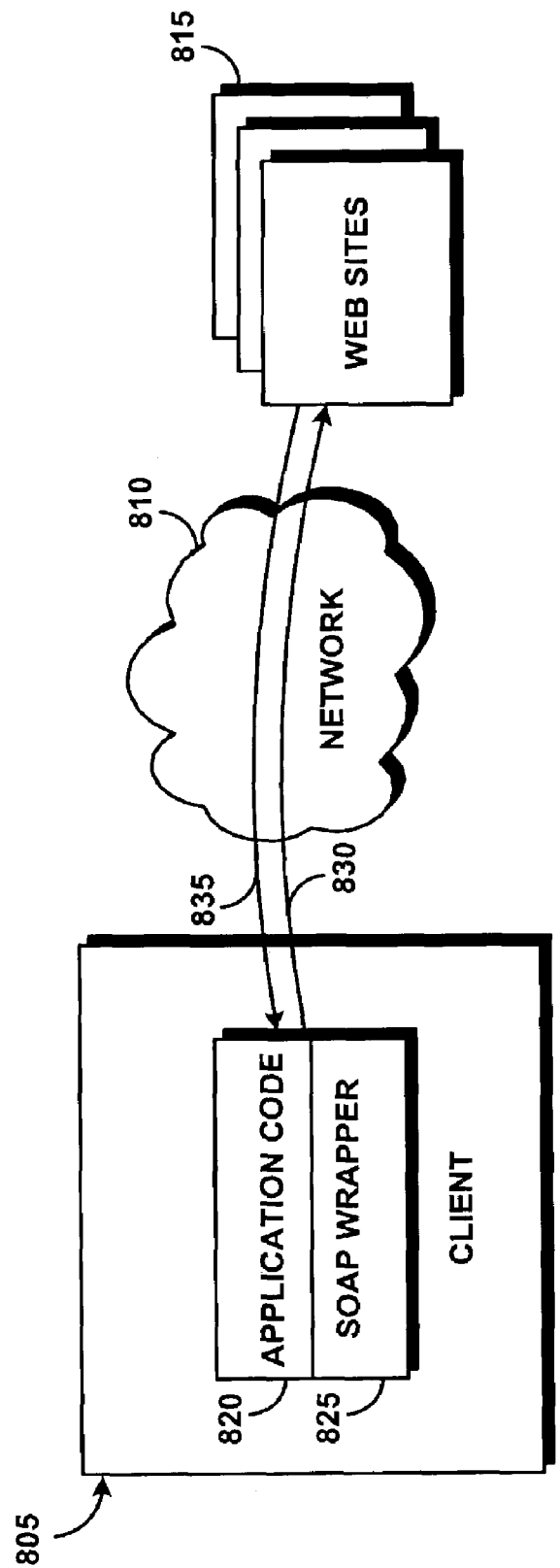
FIG. 8 illustrates a high-level architecture of an alternative embodiment of the run-time phase of the system of FIG. 1.

An alternative embodiment of the run-time phase of system 10 is shown in FIG. 8. In this embodiment, the functions of the gateway are included in the client 805, allowing the client to directly communicate through the network 810 to the Web site 815.

The client is comprised of an application code 820 developed by a programmer and an HTTP wrapper 825. The client sends a request to the Web site 815 via network link 830. The request is coded in HTML using HTTP protocol. The Web site 815 responds to the request in HTML using HTTP protocol and transmits it back to the client via network link 835. This format is recognized by the client 805 and translated as needed for the application code 820.

Figure 9:
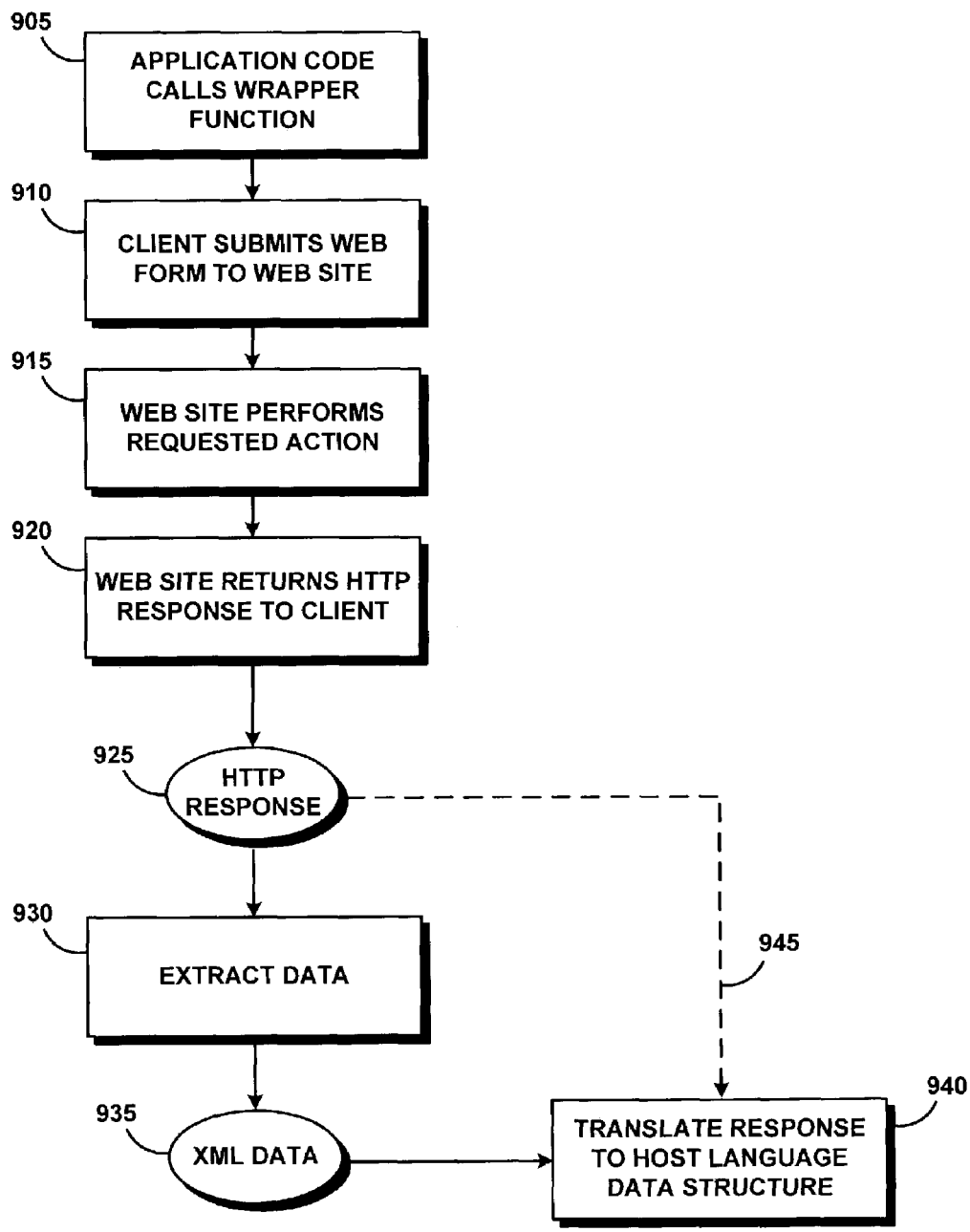
FIG. 9 is a flow chart illustrating the performance of the system of FIG. 1 during the alternative embodiment of the run-time phase.

The runtime phase operation of the alternative embodiment is illustrated by the flowchart of FIG. 9. The client 805 wishes to make a programmatic request of the Web site 815. This process is initiated when the application code 820 calls the HTTP wrapper function in step 905. The wrapper function is generated by the executable code generator. The HTTP wrapper 825 translates the host language structure, such as Java, to HTTP using the executable code that is stored in the service database. The request of the client 805 is submitted in step 910 to the Web site 815 via network link 830, using the HTTP protocol.

In step 915, the Web site 815 performs the action requested by the user in step 905, i.e., execute a database query. The Web site 815 returns the response to the client 805 in step 920; the data format for the response shown by network link 835 is typically HTML, using HTTP protocol. In a preferred method of system 10, the HTTP response (step 925) is processed by the client 805 to extract data in step 930.

The result of the data extraction is shown in step 935 as XML data. In step 940, the client application code 820 translates the XML data to the host language data structure such as JAVA. Alternatively, the HTTP response is not translated to XML first, but is instead translated directly from HTTP to the host language data structure in step 940, as shown by optional link 945.

It is to be understood that the specific embodiments of the invention that have been described are merely illustrative of certain application of the principle of the present invention. Numerous modifications may be made to the automatic service interface creation for Web sites invention described herein without departing from the spirit and scope of the present invention. Moreover, while the present invention is described for illustration purpose only in relation to the WWW, it should be clear that the invention is applicable as well to databases and other tables with indexed entries.

What is claimed is:

1. A processor-implemented method for creating a web service to programmatically access a network addressable location via an intermediate gateway, comprising:
   analyzing a network page at the network addressable location;
   generating, at the intermediate gateway, a service description file for the network page;
   translating the service description file into an executable code;
   translating the service description file into a standard Web service format including at least one of web service description language (WSDL), well-defined service (WDS), or interface service deployment (ISD);
   compiling the executable code;
   deploying the web service to the intermediate gateway, wherein the web service includes the compiled executable code and the translated service description file, making the web service available to a client application;
   providing a runtime process to enable the client application to automatically make a programmatic request of the network addressable location;
   wherein the programmatic request includes a host language having a structure;
   translating the structure of the programmatic request to a syntax of the network addressable location using a simple object access protocol (SOAP);
   submitting the programmatic request that uses the translated structure to the network addressable location using SOAP;
   the network addressable location executing the submitted programmatic request to obtain a response;
   translating the response to extract data satisfying the programmatic request;
   wrapping the extracted data in a SOAP envelope; and
   translating the wrapped response to a host data structure of the client application.

2. The method of claim 1, further comprising registering the web service in a universal description, discovery, and integration (UDDI) registry.

3. The method of claim 1, further comprising returning the translated, retrieved network page in a predetermined syntax to the client application.

4. The method of claim 3, wherein the predetermined syntax includes XHTML.

5. The method of claim 1, wherein the service description of the network page contains the following information: an application programming interface description in the form of a web services description language file; a well-defined service file, and an interface service deployment file.

6. The method of claim 1, further comprising deploying the executable code in the simple object access protocol (SOAP) service manager using the interface service deployment file.

7. The method of claim 6, further comprising publishing the executable code that has been deployed in the simple object access protocol service manager in a registry using the web services description language file and the well-defined service file.

8. The method of claim 6, wherein the simple object access protocol request includes the simple object access protocol request that is based on XML syntax.

9. A computer program product having executable instruction codes that are stored on a computer usable medium, for creating a web service to programmatically access a network addressable location via an intermediate gateway, comprising:
   a set of instruction codes for analyzing a network page at the network addressable location;
   a set of instruction codes for generating, at the intermediate gateway, a service description file for the network page;
   a set of instruction codes for translating the service description file into an executable code;
   a set of instruction codes for translating the service description file into a standard Web service format including at least one of web service description language (WSDL), well-defined service (WDS), or interface service deployment (ISD);
   a set of instruction codes for compiling the executable code;
   a set of instruction codes for deploying the web service to the intermediate gateway, wherein the web service includes the compiled executable code and the translated service description file, making the web service available to a client application;
   a set of instruction codes for providing a runtime process to enable the client application to automatically make a programmatic request of the network addressable location;
   wherein the programmatic request includes a host language having a structure;
   a set of instruction codes for translating the structure of the programmatic request to a syntax of the network addressable location using a simple object access protocol (SOAP);
   a set of instruction codes for submitting the programmatic request that uses the translated structure to the network addressable location using SOAP;
   the network addressable location executing the submitted programmatic request to obtain a response;
   a set of instruction codes for translating the response to extract data satisfying the programmatic request;

a set of instruction codes for wrapping the extracted data in a SOAP envelope; and a set of instruction codes for translating the wrapped response to a host data structure of the client application.

10. The computer program product of claim 9, wherein the service description of the network page contains the following information: an application programming interface description in the form of a web services description language file; a well-defined service file, and an interface service deployment file.

11. The computer program product of claim 10, further comprising a set of instruction codes for using the service description to generate and for compiling an executable program code.

12. The computer program product of claim 11, further comprising a set of instruction codes for deploying the executable program code in the simple object access protocol (SOAP) service manager using the interface service deployment file.

13. The computer program product of claim 12, wherein the simple object access protocol request includes the simple object access protocol request that is based on XML syntax.

14. A processor-implemented system for creating a service interface to programmatically access a network addressable location via an intermediate gateway, comprising:

means for analyzing a network page at the network addressable location;

means for generating, at the intermediate gateway, a service description file for the network page;

means for translating the service description file into an executable code;

means for translating the service description file into a standard Web service format including at least one of web service description language (WSDL), well-defined service (WDS), or interface service deployment (ISD);

means for compiling the executable code;

means for deploying the web service to the intermediate gateway, wherein the web service includes the compiled executable code and the translated service description file, making the web service available to a client application;

means for providing a runtime process to enable the client application to automatically make a programmatic request of the network addressable location;

wherein the programmatic request includes a host language having a structure;

means for translating the structure of the programmatic request to a syntax of the network addressable location using a simple object access protocol (SOAP);

means for submitting the programmatic request that uses the translated structure to the network addressable location using SOAP;

the network addressable location executing the submitted programmatic request to obtain a response;

means for translating the response to extract data satisfying the programmatic request;

means for wrapping the extracted data in a SOAP envelope; and means for translating the wrapped response to a host data structure of the client application.

15. The system of claim 14, wherein the service description of the network page contains the following information: an application programming interface description in the form of a web services description language file; a well-defined service file, and an interface service deployment file.

16. The system of claim 15, further comprising means for using the service description to generate and for compiling an executable program code.

17. The system of claim 16, further comprising means for deploying the executable program code in the simple object access protocol (SOAP) service manager using the interface service deployment file.

18. The system of claim 17, wherein the simple object access protocol request includes the simple object access protocol request that is based on XML syntax.

* * * * *